(No Model.)
M. DREXLER.
THISTLE PULLER.
No. 418,913. Patented Jan. 7, 1890.
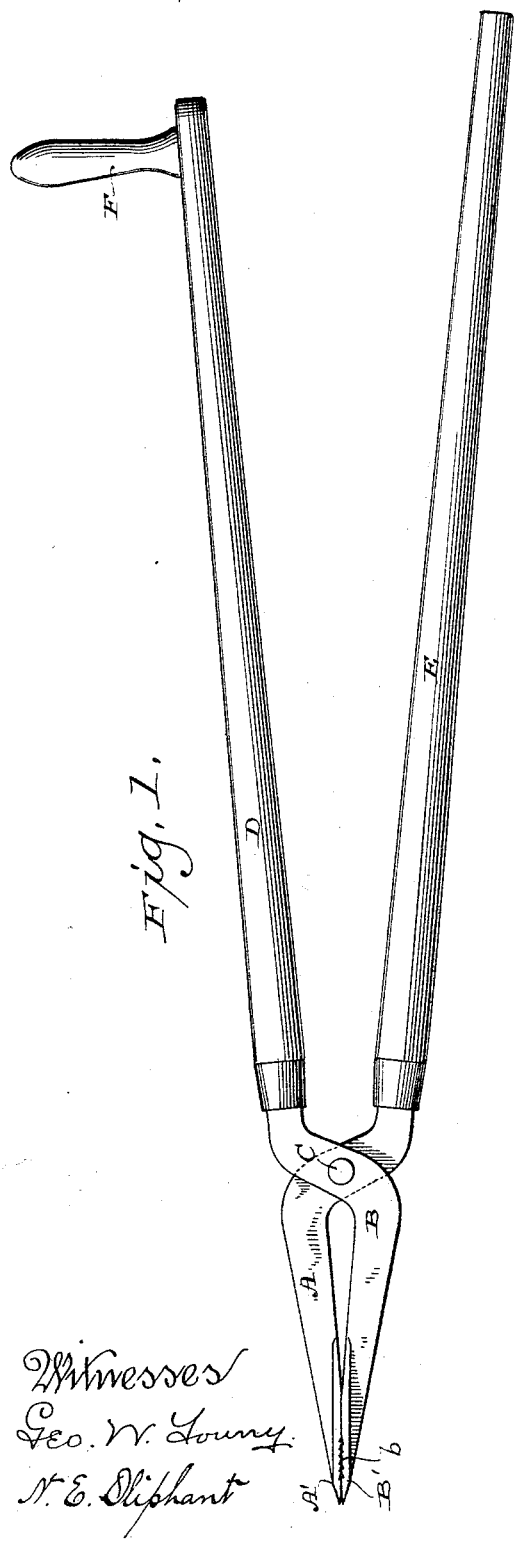
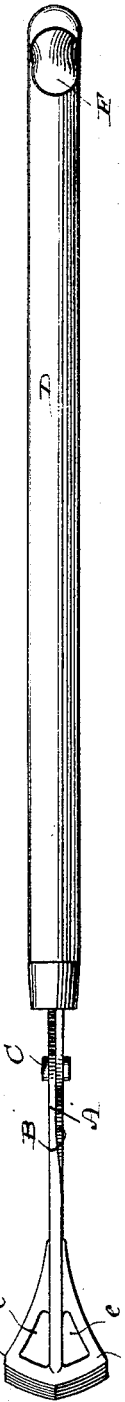
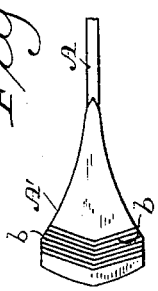

UNITED STATES PATENT OFFICE.

MICHAEL DREXLER, OF ST. GEORGE, WISCONSIN.

THISTLE-PULLER.

SPECIFICATION forming part of Letters Patent No. 418,913, dated January 7, 1890.

Application filed July 15, 1889. Serial No. 317,595. (No model.)

*To all whom it may concern:*

Be it known that I, MICHAEL DREXLER, of St. George, in the county of Sheboygan, and in the State of Wisconsin, have invented certain new and useful Improvements in Thistle-Pullers; and I do hereby declare that the following is a full, clear, and exact description thereof.

My invention relates to a device for pulling thistle-plants from the ground; and it consists in certain peculiarities of construction and combination of parts, to be hereinafter described, with reference to the accompanying drawings, and subsequently claimed.

In the drawings, Figure 1 represents a side elevation of my device; Fig. 2, a front elevation of the same, and Fig. 3 a detail view of a blade that forms part of my device.

Referring by letter to the drawings, A B represent two angular metal shanks that cross each other, and are united by a pivot C, the upper ends of these shanks being inserted in vertical handles D E, the former one of these handles being preferably provided with a lateral grip-piece F, as best illustrated in Fig. 1. Welded to the lower ends of the shanks A B are steel jaws A' B', the latter being preferably provided with corrugations $b$ upon their inner faces. The lower ends of the jaws are reduced to a cutting-edge, and so shaped as to readily enter the ground, and, as shown in Fig. 2, said jaws are provided with openings $c$, to allow the escape of earth when grasping a thistle-stalk below the surface.

In the operation of my device the shanks A B are spread apart on their pivot and the jaws forced into the ground, so as to come on opposite sides of a thistle-stalk; then by actuating the handles D E, said thistle-stalk is firmly grasped by said jaws and drawn out, the grasp being very tight by reason of the corrugations $b$, above described.

Instead of the handles D E, it is obvious that I may extend the shanks A B in an upward direction, and have these extensions serve as handles.

Having thus described my invention, what I claim as new, and desire to secure by Letters Patent, is—

A device for pulling thistle-plants that comprises two angular shanks that cross each other, a pivot uniting the shanks at their crossing-point, and jaws welded to the lower ends of said shanks, and provided with openings, substantially as set forth.

In testimony that I claim the foregoing I have hereunto set my hand, at St. George, in the county of Sheboygan and State of Wisconsin, in the presence of two witnesses.

MICHAEL DREXLER.

Witnesses:
J. HOFFMANN,
C. GARTMANN.